United States Patent
Ozturk et al.

(10) Patent No.: US 8,406,255 B2
(45) Date of Patent: Mar. 26, 2013

(54) METHOD AND APPARATUS FOR CONTROLLING DATA TRANSMISSION IN A WIRELESS COMMUNICATION SYSTEM

(75) Inventors: Ozcan Ozturk, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 12/105,640

(22) Filed: Apr. 18, 2008

(65) Prior Publication Data

US 2008/0259833 A1 Oct. 23, 2008

Related U.S. Application Data

(60) Provisional application No. 60/913,505, filed on Apr. 23, 2007.

(51) Int. Cl.
- *H04J 3/16* (2006.01)
- *H04J 3/24* (2006.01)
- *H04W 4/00* (2009.01)
- *H04W 72/00* (2009.01)

(52) U.S. Cl. ........................ 370/468; 370/474

(58) Field of Classification Search ............... 370/462, 370/465, 468, 470, 429, 208, 349, 328, 229, 370/338, 353, 342, 331, 335, 278, 329, 395.4, 370/235

See application file for complete search history.

(56) References Cited

U.S. PATENT DOCUMENTS

| | | | | |
|---|---|---|---|---|
| 5,249,201 A * | 9/1993 | Posner et al. | ............... | 375/295 |
| 6,091,709 A * | 7/2000 | Harrison et al. | ............... | 370/235 |
| 6,832,195 B2 | 12/2004 | Johnson | | |
| 7,257,423 B2 * | 8/2007 | Iochi | ............... | 455/561 |
| 7,630,321 B2 * | 12/2009 | Jain et al. | ............... | 370/252 |
| 2003/0147369 A1 * | 8/2003 | Singh et al. | ............... | 370/338 |
| 2005/0207359 A1 * | 9/2005 | Hwang et al. | ............... | 370/278 |
| 2005/0255833 A1 * | 11/2005 | Bar-Or | ............... | 455/412.1 |
| 2006/0057978 A1 * | 3/2006 | Love et al. | ............... | 455/127.1 |
| 2008/0008203 A1 * | 1/2008 | Frankkila et al. | ............... | 370/412 |
| 2009/0280822 A1 * | 11/2009 | Ericson et al. | ............... | 455/452.2 |

FOREIGN PATENT DOCUMENTS

| | | |
|---|---|---|
| EP | 1513272 | 3/2005 |
| EP | 1686743 | 8/2006 |
| JP | 2001516975 | 10/2001 |
| JP | 2006087111 A | 3/2006 |
| JP | 2007535201 | 11/2007 |

(Continued)

OTHER PUBLICATIONS

Taiwan Search Report—TW097114930—TIPO—Jan. 6, 2012.

(Continued)

*Primary Examiner* — Kevin C Harper
*Assistant Examiner* — Samina Choudhry
(74) *Attorney, Agent, or Firm* — Charles Chesney (57) ABSTRACT

Techniques for controlling data transmission are described. In an aspect, a user equipment (UE) determines whether to send a packet based on available transmit power. The UE determines a first packet size based on the available transmit power and sends a packet of the first packet size if it is equal to or larger than a minimum packet size. The UE sends a packet of a second packet size (e.g., the minimum packet size) if the first packet size is smaller than the minimum packet size and if at least one condition is met, e.g., the available transmit power is greater than a power threshold and the delay of a packet to send is larger than a delay threshold. In another aspect, the UE operates in a discontinuous transmission (DTX) mode and cancels the DTX mode if the delay of a packet to send exceeds a threshold.

23 Claims, 6 Drawing Sheets

FOREIGN PATENT DOCUMENTS

| | | |
|---|---|---|
| JP | 2008514033 A | 5/2008 |
| WO | WO 2005011212 | 2/2005 |
| WO | WO 2005039209 A1 | 4/2005 |
| WO | WO 2005039229 A1 | 4/2005 |
| WO | WO 2006103099 A1 | 10/2006 |

OTHER PUBLICATIONS

Partial International Search Report—PCT/US08/061339—International Search Authority, European Patent Office—Oct. 21, 2008.

International Search Report—PCT/US08/061339. International Search Authority—European Patent Office—Feb. 10, 2009.

Written Opinion—PCT/US08/061339, International Search Authority—European Patent Office—Feb. 10, 2009.

Das, Arnab, et al., Adaptive, Asynchronous Incremental Redundancy (A2IR) With Fixed Transmission Time Intervals (TTI) for HSDPA, IEEEE, 2002, pp. 1083-1087.

* cited by examiner

METHOD AND APPARATUS FOR CONTROLLING DATA TRANSMISSION IN A WIRELESS COMMUNICATION SYSTEM

The present application claims priority to provisional U.S. Application Ser. No. 60/913,505, entitled "METHOD AND APPARATUS FOR DATA TRANSMISSION SELECTION," filed Apr. 23, 2007, assigned to the assignee hereof and incorporated herein by reference.

BACKGROUND

I. Field

The present disclosure relates generally to communication, and more specifically to techniques for transmitting data in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a Node B may communicate with one or more user equipments (UEs). A UE may have one or more flows, which may have different delay requirements. Furthermore, the UE may have limited transmit power and may observe different channel conditions over time. It may be desirable to transmit data for all of the flows in a manner to achieve good performance given the limited transmit power and the time varying channel conditions.

SUMMARY

Techniques for controlling data transmission to achieve good performance are described herein. In an aspect, a UE determines whether to send a packet of data based on available transmit power for data. The UE may determine the available transmit power by computing a power headroom, filtering the power headroom, and subtracting transmit power for other transmissions from the filtered power headroom. The UE may determine a first packet size based on (or supported by) the available transmit power. The UE may send a packet of the first packet size if it is equal to or larger than a minimum packet size. The UE may send a packet of a second packet size larger than the first packet size if the first packet size is smaller than the minimum packet size and if at least one condition is met. The second packet size may be equal to the minimum packet size or some other packet size. In one design, the UE may determine a third packet size based on the available transmit power and a power offset, which may be determined based on a desired decoding probability. The UE may send a packet of the second packet size if one or more of the following conditions are met (i) the third packet size is equal to or larger than the minimum packet size, (ii) the available transmit power is greater than a power threshold, and (iii) the delay of a packet at the head of a queue is larger than a delay threshold.

In another aspect, the UE may operate in a discontinuous transmission (DTX) mode, send packets in enabled subframes while operating in the DTX mode, determine whether the delay of a packet to send exceeds a delay threshold, and cancel the DTX mode if the delay exceeds the delay threshold. After canceling the DTX mode, the UE may send the packet in a non-enabled subframe instead of waiting until the next enabled subframe.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.20, IEEE 802.16 (WiMAX), 802.11 (WiFi), Flash-OFDM®, etc. UTRA and E-UTRA are part of UMTS. 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for UMTS, and 3GPP terminology is used in much of the description below.

Figure 1:
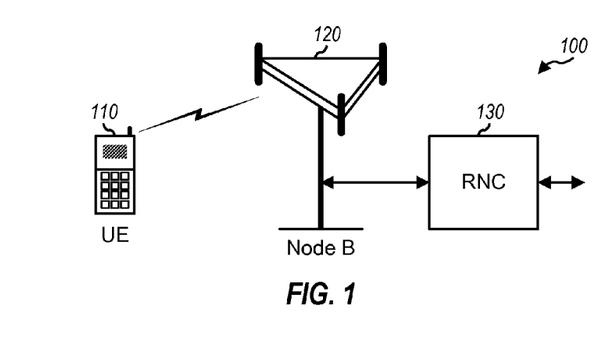
FIG. 1 shows a wireless communication system.

FIG. 1 shows a wireless communication system 100. For simplicity, only one UE 110, one Node B 120, and one Radio Network Controller (RNC) 130 are shown in FIG. 1. Node B 120 is a station that communicates with the UEs and may also be referred to as an evolved Node B (eNB), a base station, an access point, etc. Node B 120 may communicate with RNC 130, which may provide coordination and control for the Node Bs coupled to the RNC. Node B 120 and RNC 130 may be part of a radio access network (RAN). System 100 may include other network entities not shown in FIG. 1 for simplicity.

UE 110 may be stationary or mobile and may also be referred to as a mobile station, a terminal, an access terminal, a subscriber unit, a station, etc. UE 110 may be a cellular phone, a personal digital assistant (PDA), a wireless device, a handheld device, a wireless modem, a laptop computer, etc. UE 110 may communicate with Node B 120 via transmissions on the downlink and uplink. The downlink (or forward link) refers to the communication link from the Node B to the UE, and the uplink (or reverse link) refers to the communication link from the UE to the Node B. The techniques described herein may be used for data transmission on the downlink as well as the uplink. For clarity, certain aspects of the techniques are described below for data transmission on the uplink.

3GPP Release 5 and later supports High-Speed Downlink Packet Access (HSDPA). 3GPP Release 6 and later supports High-Speed Uplink Packet Access (HSUPA). 3GPP Release 7 and later supports High-Speed Packet Access (HSPA+). HSDPA and HSUPA are sets of channels and procedures that enable high-speed packet data transmission on the downlink and uplink, respectively. HSPA+ provides further improvements in both the downlink and uplink. Table 1 lists some physical channels used for HSDPA and HSUPA in 3GPP Release 6. Enhanced Dedicated Channel (E-DCH) is a transport channel used for HSDPA and HSUPA.

TABLE 1

| Channel | Channel Name | Description |
| --- | --- | --- |
| P-CCPCH (Downlink) | Primary Common Control Physical Channel | Carry pilot and system frame number (SFN) |
| E-DPCCH (Uplink) | E-DCH Dedicated Physical Control Channel | Carry signaling for the E-DPDCH |
| E-DPDCH (Uplink) | E-DCH Dedicated Physical Data Channel | Carry packets sent on the uplink by a UE |
| E-HICH (Downlink) | E-DCH Hybrid ARQ Indicator Channel | Carry ACK/NAK for packets sent on the E-DPDCH |

Figure 2:
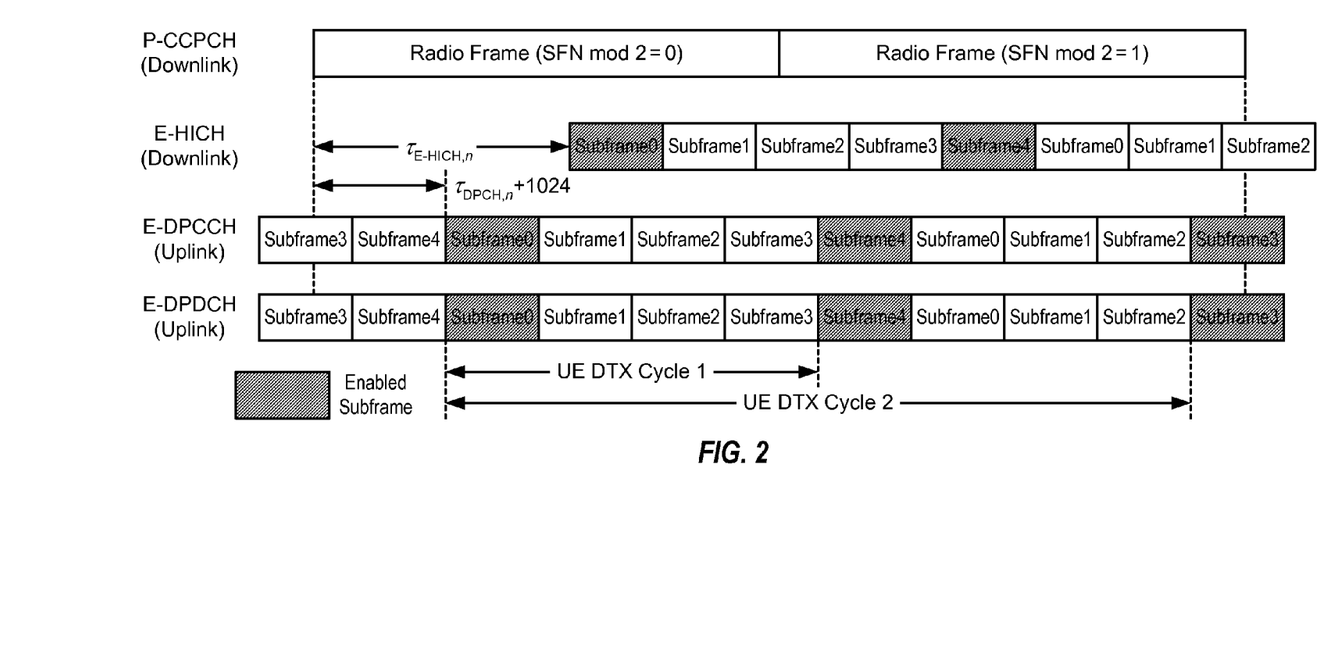
FIG. 2 shows some physical channels used for uplink data transmission.

FIG. 2 shows some of the physical channels used for HSUPA. In UMTS, the transmission time line is partitioned into units of radio frames. Each radio frame has a duration of 10 milliseconds (ms) and is partitioned into five subframes. Each subframe has a duration of 2 ms and includes three slots. Each slot has a duration of 0.67 ms and includes 2560 chips.

The P-CCPCH is sent on the downlink and is used directly as timing reference for the downlink physical channels and indirectly as timing reference for the uplink physical channels. For HSUPA, the frame timing of the E-HICH is offset by $\tau_{E\text{-}HICH,n}$ chips from the frame timing of the P-CCPCH. The E-DPCCH and E-DPDCH are time-aligned and their frame timing is offset by $\tau_{DPCH,n}+1024$ chips from the frame timing of the P-CCPCH. The frame timing of the downlink and uplink physical channels as well as the various timing offsets are described in 3GPP TS 25.211.

3GPP supports HARQ for HSUPA. For HARQ, a transmitter may send a transmission for a packet of data to a receiver and may send one or more additional transmissions until the packet is decoded correctly by the receiver, or the maximum number of transmissions has been sent, or some other termination condition is encountered. HARQ may improve reliability of data transmission. A packet may also be referred to as a transport block, a data packet, a physical layer (PHY) packet, a subpacket, a codeword, a data block, etc.

Figure 3:
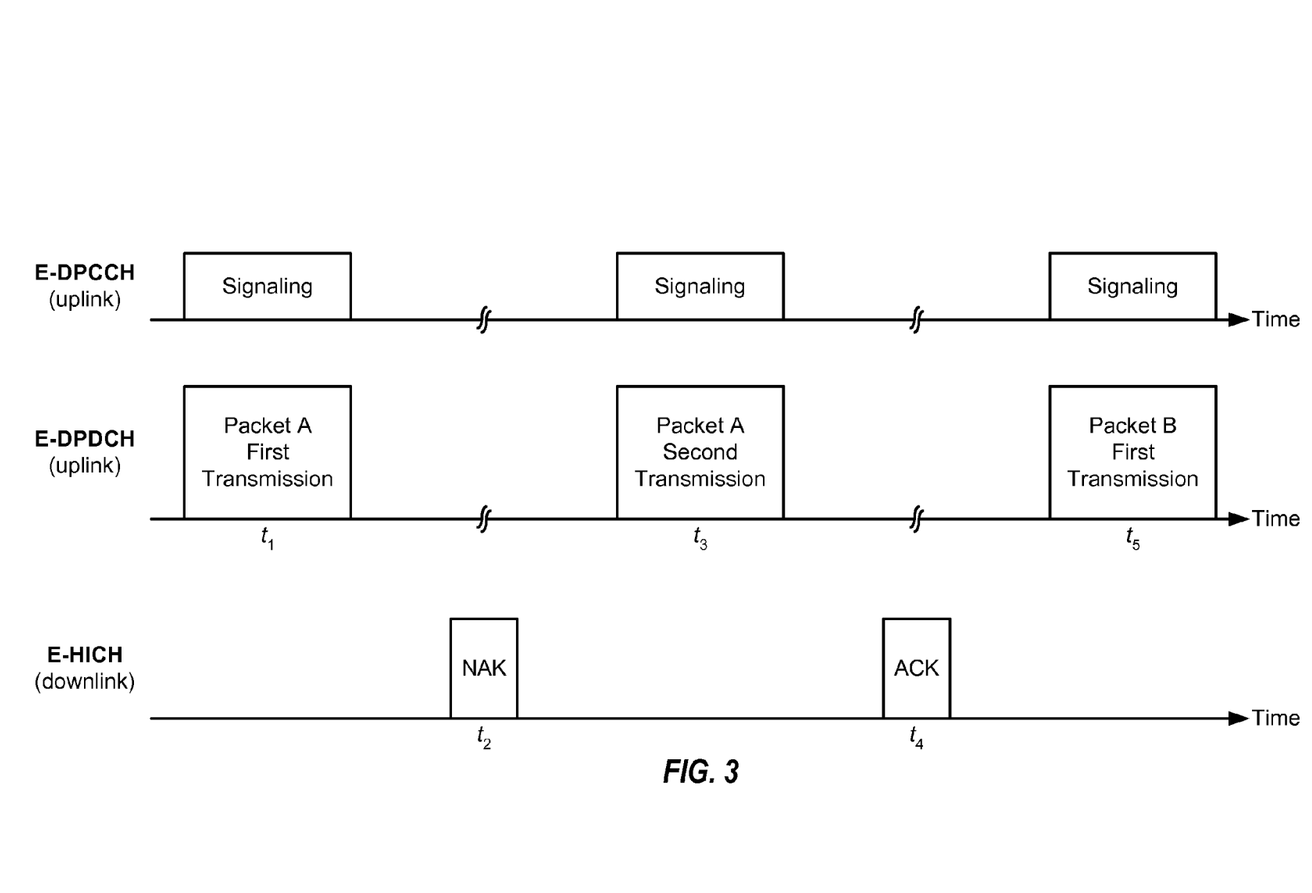
FIG. 3 shows transmission with Hybrid Automatic Repeat reQuest (HARQ).

FIG. 3 shows an example HARQ transmission on the uplink with HSUPA. In this example, UE 110 processes (e.g., encodes and modulates) packet A and sends a first transmission of packet A on the E-DPDCH in transmission time interval (TTI) $t_1$. A TTI may be 2 ms or 10 ms for HSUPA. Node B 120 receives the first transmission, decodes packet A in error, and sends a negative acknowledgement (NAK) on the E-HICH in TTI $t_2$. UE 110 receives the NAK and sends a second transmission of packet A in TTI $t_3$. Node B 120 receives the second transmission, decodes packet A correctly based on the first and second transmissions, and sends an acknowledgement (ACK) in TTI $t_4$. UE 110 then processes and transmits the next packet B in similar manner. UE 110 may send signaling on the E-DPCCH along with each data transmission on the E-DPDCH, as shown in FIG. 1.

For HARQ, UE 110 may send up to $N_{max}$ transmissions for a packet until an ACK is received. $N_{max}$ is the maximum number of transmissions and may be a configurable value. UE 110 may process and send packets such that they can be decoded correctly by Node B 120 with a probability of $Q_{target}$ (e.g., 90%) after $N_{target}$ transmissions, where $N_{target}$ is typically less than $N_{max}$. $Q_{target}$ is referred to as a target decoding probability and may be selected to achieve good data transmission performance. If $N_{target}>1$, then the probability of correctly decoding a packet (which is referred to as the decoding probability) would be worse than $Q_{target}$ after the first transmission of the packet and would improve with each additional transmission of the packet.

For simplicity, FIG. 3 shows data transmission on one HARQ interlace. Multiple HARQ interlaces may be defined, with each HARQ interlace including TTIs that are separated by L TTIs, where L may be a fixed or configurable value. All transmissions of a given packet may be sent on one HARQ interlace. Whenever a packet sent on an HARQ interlace is successfully decoded, another packet may be sent on that HARQ interlace. UE 110 may be assigned one or more HARQ interlaces for data transmission on the uplink.

At every TTI, UE 110 may determine whether the HARQ interlace for that TTI is available, e.g., not used for transmission of a pending packet. If the HARQ interlace is available and if there is data to send, then UE 110 may determine a transport format to use in the TTI. A transport format may also be referred to as a packet format, a modulation and coding scheme, a rate, etc. A transport format may be associated with a transport block size (or packet size), a modulation scheme, a code rate, etc. UE 110 may determine the available transmit power in the TTI and may select a suitable transport format based on the available transmit power, as described below.

UE 110 may transmit pilot, data, and signaling/overhead information on the uplink to Node B 120. The transmit power for pilot may be adjusted based on closed loop power control to achieve a target received signal quality for the pilot at Node B 120. UE 110 may also have certain maximum transmit power, which may be determined by regulatory restrictions. A power headroom for UE 110 may be computed as follows:

$$T(m) = \frac{P_{max}}{P_{pilot}(m)}, \qquad \text{Eq (1)}$$

where $P_{pilot}(m)$ is the transmit power for pilot in slot m,
$P_{max}$ is the maximum transmit power for UE 110, and
T(m) is a power headroom for slot m.

In general, the power headroom may be computed in each slot (as described above), each TTI, etc. The power headroom indicates the amount of transmit power available for data and other transmissions and is given as a ratio of the maximum transmit power to the pilot transmit power. The power headroom may fluctuate from slot to slot, especially if UE 110 is mobile.

In one design, the power headroom may be averaged with an infinite impulse response (IIR) filter, as follows:

$$T_{avg}(m) = \alpha \cdot T_{avg}(m-1) + (1-\alpha) \cdot T(m), \qquad \text{Eq (2)}$$

where $T_{avg}(m)$ is an average power headroom in slot m, and
α is a coefficient for the IIR filter.

Coefficient α determines the amount of averaging, with a larger α corresponding to more averaging, and vice versa. In another design, the power headroom may be averaged with a finite impulse response (FIR) filter to obtain the average power headroom.

The transmit power for pilot may be adjusted by power control in each slot. The power headroom may be updated in each slot as described above, and the value closest to TTI boundary may be selected for use. Conversely, pilot may not be sent in a given TTI due to DTX operation. In this case, the last value of the pilot transmit power that was updated by power control may be used as $P_{pilot}(m)$ to update $T(m)$.

Data may be sent in a TTI, which may include 3 slots for 2 ms TTI or 15 slots for 10 ms TTI. The following computation/processing may be performed in each TTI in which data may be sent. The average power headroom $T_{avg}(m)$ for slot m at the boundary of TTI n may be used and may be denoted as $T_{avg}(n)$.

The transmit power available for data may be computed as follows:

$$T_{data}(n)=T_{avg}(n)-T_{other}(n), \quad \text{Eq (3)}$$

where $T_{other}(n)$ is an overhead-to-pilot ratio (O2P) for other transmissions in TTI n, and $T_{data}(n)$ is a traffic-to-pilot ratio (T2P) for data in TTI n.

$T_{data}(n)$ and $T_{other}(n)$ convey the transmit powers for data and other transmissions, respectively, relative to the transmit power for pilot. The absolute transmit power for data may be given as $P_{data}(n)=T_{data}(n) \cdot P_{pilot}(n)$ and may be used for data sent on the E-DPDCH or some other physical channel. The absolute transmit power for other transmissions may be given as $P_{other}(n)=T_{other}(n) \cdot P_{pilot}(n)$. $T_{other}(n)$ or $P_{other}(n)$ may be determined for TTI n based on signaling to send on the E-DPCCH and HS-DPCCH, other data and/or signaling to send on other physical channels, etc. In the description herein, the available transmit power is the transmit power available for data (e.g., to send on the E-DPDCH) and may be given by $T_{data}(n)$ or $P_{data}(n)$. The other transmit power is the transmit power used for other transmissions and may be given by $T_{other}(n)$ or $P_{other}(n)$.

Figure 4:
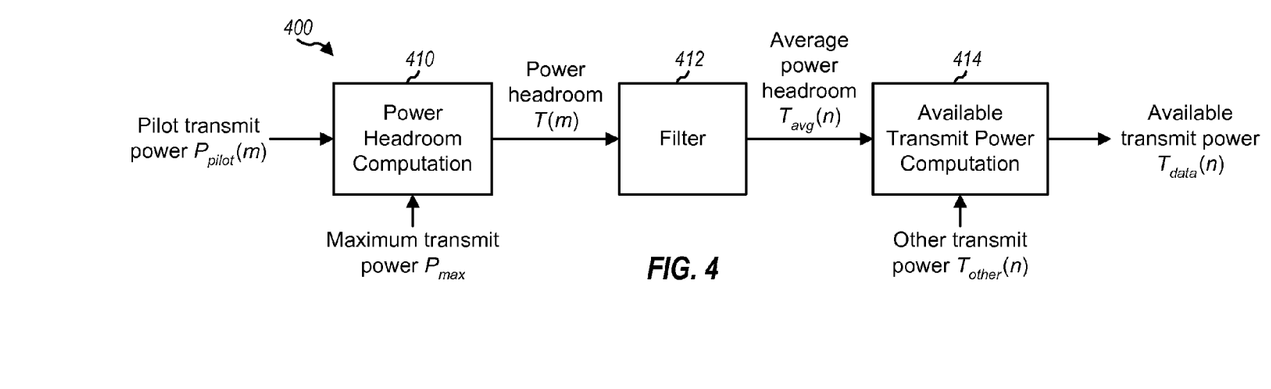
FIG. 4 shows a block diagram of an available transmit power determination unit.

FIG. 4 shows a block diagram of a design of an available transmit power determination unit 400. Within unit 400, a unit 410 receives the pilot transmit power $P_{pilot}(m)$ and the maximum transmit power $P_{max}$ for UE 110 and computes the power headroom $T(m)$, e.g., as shown in equation (1). A filter 412 averages the power headroom, e.g., as shown in equation (2), and provides the average power headroom $T_{avg}(n)$. A unit 414 receives the average power headroom and the other transmit power and computes the available transmit power $T_{data}(n)$, e.g., as shown in equation (3).

UE 110 may have one or more (K) flows. Each flow may carry data and/or signaling for one or more applications and may be associated with certain quality of service (QoS) requirements. For example, a flow for Voice-over-Internet Protocol (VoIP) may have more stringent delay requirements than a flow for data download. UE 110 may maintain a queue/buffer for each flow and may store data for each flow in the queue for that flow. In one design, UE 110 may maintain the following parameters for each flow k:

Priority $(k,n)$—the priority of flow k in TTI n,
$S_{min}(k)$—a minimum packet size for flow k,
$P_{os}(k)$—a power offset for flow k,
$D(k,n)$—a delay of a packet at the head of the queue for flow k in TTI n, and
$D_{th}(k)$—a delay threshold for flow k.

For each flow, the values of the parameters given above may be determined based on data/QoS requirements of the application(s) mapped to that flow. The priority and the head-of-queue delay for each flow may be updated in each TTI. The remaining parameters for each flow may have static values. $D(k,n)$ may be the head-of-queue delay or some other delay. For example, $D(k,n)$ may be the delay of flow k and may be computed as a weighted or unweighted average delay of all packets in the queue for flow k, a weighted or unweighted average delay of packets whose delays exceed a delay threshold, etc.

At every TTI that is available for data transmission, UE 110 may update the priority of each flow and may select the flow with the highest priority, which is referred to as flow k in the description below. UE 110 may determine the packet size supported by the available transmit power $T_{data}(n)$, as follows:

$$S_1(n)=F\{T_{data}(n)\}, \quad \text{Eq (4)}$$

where $S_1(n)$ is the packet size supported by $T_{data}(n)$ and $F\{\}$ is a mapping function.

The mapping function $F\{\}$ may be based on the target number of transmissions $N_{target}$ for each packet. For a given $N_{target}$, progressively larger packet size may be supported with progressively more available transmit power. The mapping function $F\{\}$ may be based on nominal T2P values, which may be signaled to UE 110 by the RAN. For a given packet size and $N_{target}$, the nominal T2P values may be higher for VoIP than data download. The same or different mapping functions may be used for different applications and flows.

If $S_1(n) \geq S_{min}(k)$, then UE 110 may transmit a packet of size $S_1(n)$ for flow k to Node B 120. However, if there is insufficient available transmit power and $S_1(n) < S_{min}(k)$, then UE 110 may compute an alternative packet size as follows:

$$S_2(n)=F\{T_{data}(n) \cdot P_{os}(k)\}, \quad \text{Eq (5)}$$

where $S_2(n)$ is the packet size supported by $T_{data}(n) \cdot P_{os}(k)$.

A packet of size $S_1(n)$ may be sent with transmit power of $T_{data}(n)$ and may be decoded correctly with probability of $Q_{target}$ after $N_{target}$ transmissions. Similarly, a packet of size $S_2(n)$ may be sent with transmit power of $T_{data}(n) \cdot P_{os}(k)$ and may be decoded correctly with probability of $Q_{target}$ after $N_{target}$ transmissions. This packet of size $S_2(n)$ may be sent with transmit power of $T_{data}(n)$ but may be decoded correctly with probability of $Q_{lower}$ after $N_{target}$ transmissions, where $Q_{lower} < Q_{target}$.

$P_{os}(k)$ may be determined for flow k, as follows:

$$P_{os}(k) = \frac{P_{target}(k)}{P_{lower}(k)}, \quad \text{Eq (6)}$$

where $P_{target}(k)$ is a transmit power that can achieve $Q_{target}$ for a packet of the minimum packet size after $N_{target}$ transmissions, and $P_{lower}(k)$ is a transmit power that can achieve $Q_{lower}$ for the packet of the minimum packet size after $N_{target}$ transmissions.

In general, progressively larger value of $P_{os}(k)$ corresponds to (i) progressively lower value of $Q_{lower}$ for a given packet size and (ii) progressively smaller packet size $S_2(n)$ for a given value of $Q_{lower}$. For example, $Q_{target}$ may be equal to 90%, and $Q_{lower}$ may be equal to 70% for one value of $P_{os}(k)$, 50% for a larger value of $P_{os}(k)$, etc. $P_{os}(k)$ may be selected based on the application. For example, it may be desirable to have 90% decoding success rate whenever possible for VoIP, and it may be better to send a packet with 50% decoding success rate when there is insufficient transmit power than not transmit at all. However, if $Q_{lower}$ is too low, then the low decoding success rate may not justify the interference caused by transmitting the packet. For each flow, $P_{os}(k)$ may be determined based on the desired $Q_{lower}$ and other pertinent parameters. $P_{os}(k)$ may be equal to one or more decibels (dB).

In one design, a packet of size $S_{min}(k)$ or $S_2(n)$ may be transmitted when $S_1(n)<S_{min}(k)$. In another design, a packet of size $S_{min}(k)$ or $S_2(n)$ may be transmitted only if both $S_1(n)<S_{min}(k)$ and $D(k, n)>D_{th}(k)$. In this design, a packet is transmitted only if its delay exceeds the delay threshold for the flow.

In one design, data transmission selection may be based on the following pseudo-code.
10 If $S_1(n) \geq S_{min}(k)$, then transmit a packet of size $S_1(n)$,
20 Else if $\{S_1(n)<S_{min}(k)\}$ and $\{D(k, n)>D_{th}(k)\}$,
30 Then transmit a packet of size $S_{min}(k)$ if $S_2(n) \geq S_{min}(k)$,
40 Else do not transmit a packet.

If data from only one flow k is sent in TTI n, then $S_{min}(k)$ and $P_{os}(k)$ for this flow may be used for data transmission selection. If data from multiple flows is sent in TTI n, then the maximum $P_{os}(k)$ of these multiple flows may be used for data transmission selection.

Figure 5:
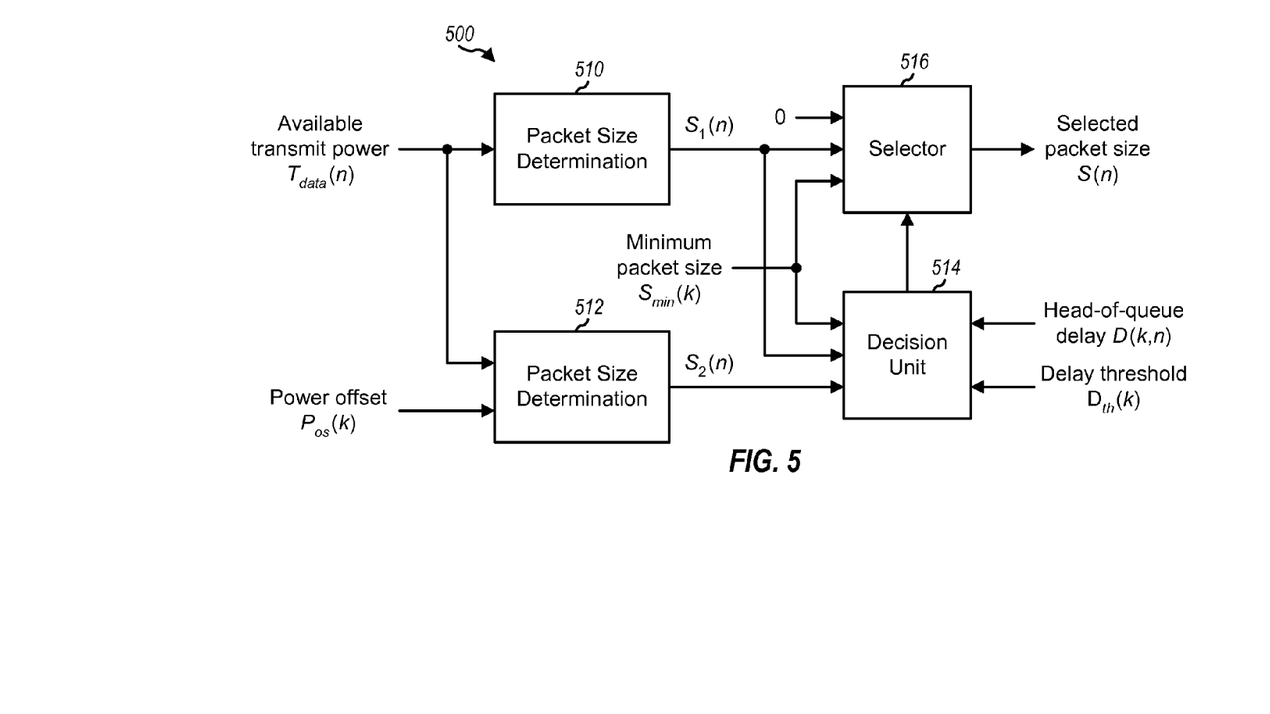
FIG. 5 shows a block diagram of a packet size selection unit.

FIG. 5 shows a block diagram of a design of a packet size selection unit 500 that selects a packet size for flow k. Within unit 500, a unit 510 receives the available transmit power $T_{data}(n)$ and determines a corresponding packet size $S_1(n)$. A unit 512 receives the available transmit power $T_{data}(n)$ and the power offset $P_{os}(k)$ for flow k and determines a corresponding packet size $S_2(n)$. Units 510 and 512 may be implemented with look-up tables or computation units. A decision unit 514 receives the computed packet sizes $S_1(n)$ and $S_2(n)$, the minimum packet size $S_{min}(k)$, the head-of-queue delay D(k,n), and the delay threshold $D_{th}(k)$ for flow k. Unit 514 generates a control based on all of the inputs. A selector 516 receives the computed packet size $S_1(n)$, the minimum packet size $S_{min}(k)$, a zero packet size, and the control from unit 514. Select 516 provides $S_1(n)$, $S_{min}(k)$, or zero as the selected packet size S(n) for flow k, as follows:

$$S(n) = \begin{cases} S_1(n) & \text{if } S_1(n) \geq S_{min}(k) \\ S_{min}(k) & \text{if } \{S_1(n) < S_{min}(k)\} \& \\ & \{D(k, n) > D_{th}(k)\} \& \{S_2(n) \geq S_{min}(k)\} \\ 0 & \text{otherwise} \end{cases} \quad \text{Eq (7)}$$

In another design, since there is a one-to-one mapping between transmit power and packet size in equation (5), the available transmit power $T_{data}(n)$ may be compared against a power threshold $T_{th}(k)$ for flow k, and a packet of size $S_{min}(k)$ may be sent if $T_{data}(n) \geq T_{th}(k)$ and other condition(s) are met. The power threshold $T_{th}(k)$ may be determined based on the power offset $P_{os}(k)$ or may be obtained in some other manner. This design avoids the determination of $S_2(n)$ while achieving the same result. In any case, the designs described herein modify the available transmit power to send a packet of the minimum size even when UE 110 does not have enough transmit power to support this packet size at the target decoding probability.

In the design shown by the pseudo-code and equation (7), a packet is sent with lower decoding probability if $D(m, n)>D_{th}(k)$. In other designs, a packet may be sent with lower decoding probability based on other conditions, e.g., the priority of flow k being higher than a priority threshold, the queue size of flow k being higher than a queue size threshold, the type of data being sent, etc. For example, if a flow carries signaling radio bearer (SRB), then a packet of signaling data may be sent even when there is not enough nominal power.

In the design shown by the pseudo-code and equation (7), the minimum packet size is selected when $\{S_1(n)<S_{min}(k)\}$ and other conditions are met. In another design, $S_2(n)$ may be selected instead of the minimum packet size. In yet another design, a packet size smaller than the minimum packet size may be selected.

The parameters $S_{min}(k)$, $D_{th}(k)$ and $P_{os}(k)$ or $T_{th}(k)$ may be application dependent. For example, $S_{min}(k)$ may be equal to the minimum packet size or the average packet size of an application, and $P_{os}(k)$ may be selected to achieve the desired $Q_{lower}$ for the application. For an application that is not delay sensitive, a value of zero may be selected for $S_{min}(k)$ and a value of one may be selected for $P_{os}(k)$. $D_{th}(k)$ controls the timing of attempts to send packets when there is insufficient available transmit power. $D_{th}(k)$ for an application that is delay sensitive may be selected based on the delay requirements of that application.

Figure 6:
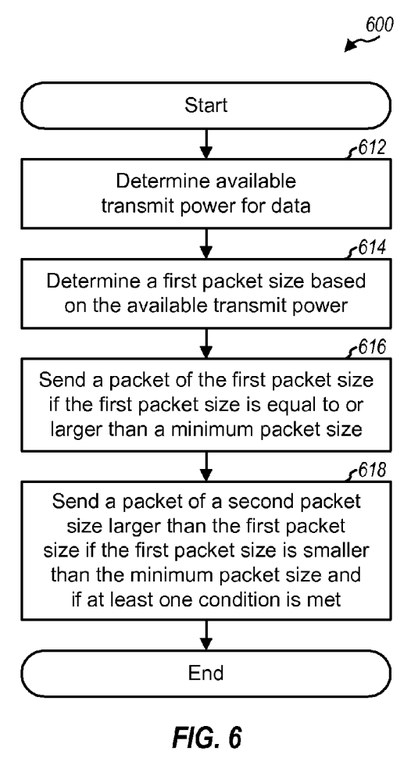
FIG. 6 shows a process for transmitting data.

FIG. 6 shows a design of a process 600 for transmitting data. Process 600 may be performed by UE 110 for uplink data transmission or Node B 120 for downlink data transmission. The available transmit power for data (e.g., $T_{data}(n)$ or $P_{data}(n)$) may be determined (block 612). For block 612, a power headroom may be computed and filtered. Transmit power for other transmissions may then be subtracted from the filtered power headroom to obtain the available transmit power. A first packet size (e.g., $S_1(n)$) may be determined based on the available transmit power, e.g., with a look-up table (block 614). A packet of the first packet size may be sent if the first packet size is equal to or larger than a minimum packet size (e.g., $S_{min}(k)$) (block 616). A packet of a second packet size (e.g., S(n)) larger than the first packet size may be sent if the first packet size is smaller than the minimum packet size and if at least one condition is met (block 618).

In one design, a third packet size (e.g., $S_2(n)$) may be determined based on the available transmit power and a power offset (e.g., $P_{os}(k)$). The power offset may be determined based on a decoding probability that is lower than a target decoding probability. The second packet size may be equal to the minimum packet size, the third packet size, or some other packet size.

The at least one condition in block 618 may include one or more of the following:
 The third packet size being equal to or larger than the minimum packet size,
 The available transmit power being greater than a power threshold,
 The delay of a packet (e.g., at the head of a queue) or a flow being larger than a delay threshold,
 The priority of a selected flow exceeding a priority threshold, and
 The queue size for the selected flow exceeding a queue size threshold.

A packet of the second packet size may be sent if any one or any combination of the conditions given above is met. A packet may also be sent based on other conditions.

Multiple flows may be present. Each flow may be associated with a respective minimum packet size, a respective power offset, and a respective delay threshold, all of which may be determined based on data requirements for the flow. The flow with the highest priority among the multiple flows may be selected. More than one flow may also be selected. A packet may be sent for the selected flow(s) in block 616 or 618.

Figure 7:
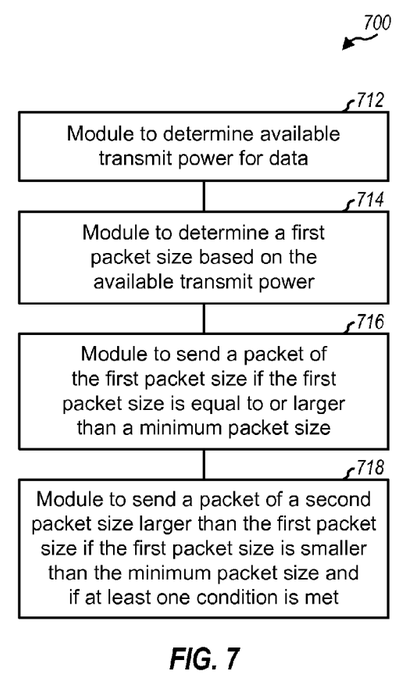
FIG. 7 shows an apparatus for transmitting data.

FIG. 7 shows a design of an apparatus 700 for transmitting data. Apparatus 700 includes a module 712 to determine available transmit power for data, a module 714 to determine a first packet size based on the available transmit power, a module 716 to send a packet of the first packet size if the first packet size is equal to or larger than a minimum packet size, and a module 718 to send a packet of a second packet size larger than the first packet size if the first packet size is smaller than the minimum packet size and if at least one condition is met.

3GPP Release 7 supports Continuous Packet Connectivity (CPC), which allows UE 110 to operate with DTX in order to conserve battery power. For DTX, UE 110 may be assigned certain enabled subframes in which the UE can transmit data and/or signaling on the uplink to Node B 120. UE 110 may power down during idle times between the enabled subframes to conserve battery power.

For CPC, the enabled subframes may be defined by the parameters given in Table 2. CPC supports a TTI of 2 ms or 10 ms. The third column of Table 2 gives possible values for the CPC parameters assuming a TTI of 2 ms.

TABLE 2

| Parameter | Description | Value |
| --- | --- | --- |
| UE DTX cycle 1 | Duration between enabled subframes when the UE has transmitted recently | 1, 4, 5, 8, 10, 16 or 20 subframes |
| UE DTX cycle 2 | Duration between enabled subframes when the UE has not transmitted recently | 4, 5, 8, 10, 16 or 20 subframes |
| UE DPCCH burst 1 | Number of enabled subframes for UE DTX cycle 1 | 1, 2 or 5 subframes |
| UE DPCCH burst 2 | Number of enabled subframes for UE DTX cycle 2 | 1, 2 or 5 subframes |

FIG. 2 shows an example configuration of DTX for UE 110 in CPC. In this example, UE 110 is configured as follows:
UE DTX cycle 1=4 subframes,
UE DTX cycle 2=8 subframes, and
UE DPCCH burst 1=UE DPCCH burst 2=1 subframe.

For the CPC configuration given above, the enabled subframes are spaced apart by four subframes and are shown with gray shading in FIG. 2. The enabled subframes may be spaced apart by other amounts for other CPC parameter values.

UE 110 may enter a DTX mode if the UE does not have any data to transmit according to a timer and other parameters configured by the RAN. In the DTX mode, power usage of UE 110 as well as the total uplink interference may be reduced, which may increase system capacity.

In another aspect, UE 110 may cancel the DTX mode in a given TTI based on the delay of the head-of-queue packet at the UE. UE 110 may have a delay threshold $D_{dtx\_th}(k)$ for each flow k for DTX cancellation. In each TTI, UE 110 may compare the head-of-queue packet delay $D(k,n)$ for each flow against the DTX cancellation delay threshold $D_{dtx\_th}(k)$ for that flow. UE 110 may cancel the DTX mode if $D(k,n) > D_{dtx\_th}(k)$ for any flow and may transmit data for the flow with $D(k,n) > D_{dtx\_th}(k)$. Node B 120 may listen in each TTI for possible data from UE 110 and may check each slot to detect for pilot preambles from the UE.

Different DTX cancellation delay thresholds may be used for different flows and/or applications. For delay sensitive data such as VoIP or video telephony, the DTX cancellation delay threshold may be selected such that the total packet delay for the communication link between UE 110 and Node B 120 is less than a maximum total delay required by the system with a certain probability. UE 110 may transmit a preamble of pilot symbols over several slots after canceling the DTX mode and may transmit data in a TTI following the preamble.

Figure 8:
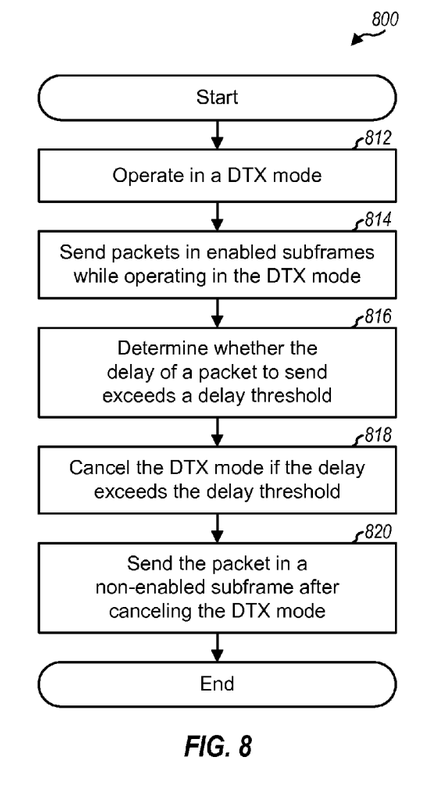
FIG. 8 shows a process for transmitting data with DTX.

FIG. 8 shows a design of a process 800 for transmitting data with DTX. Process 800 may be performed by UE 110 or some other entity. UE 110 may operate in a DTX mode (block 812) and may send packets in enabled subframes while operating in the DTX mode (block 814). UE 110 may determine whether the delay of a packet to send (e.g., at the head of a queue) exceeds a delay threshold (block 816). UE 110 may cancel the DTX mode if the delay exceeds the delay threshold (block 818). UE 110 may then send the packet in a non-enabled subframe after canceling the DTX mode instead of waiting until the next enabled subframe (block 820).

UE 110 may have multiple flows, and each flow may be associated with a respective delay threshold determined based on data requirements for the flow. UE 110 may determine whether a delay of the next packet to send for each flow exceeds a delay threshold for that flow. UE 110 may cancel the DTX mode if the delay of the next packet for any flow exceeds the delay threshold for the flow.

Figure 9:
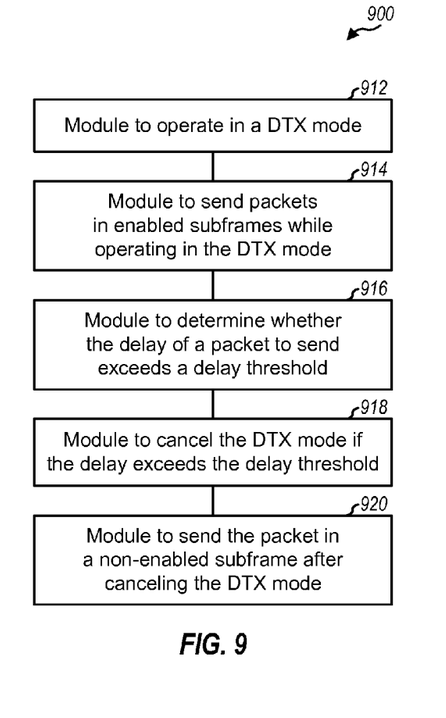
FIG. 9 shows an apparatus for transmitting data with DTX.

FIG. 9 shows a design of an apparatus 900 for transmitting data with DTX. Apparatus 900 includes a module 912 to operate in a DTX mode, a module 914 to send packets in enabled subframes while operating in the DTX mode, a module 916 to determine whether the delay of a packet to send exceeds a delay threshold, a module 918 to cancel the DTX mode if the delay exceeds the delay threshold, and a module 920 to send the packet in a non-enabled subframe after canceling the DTX mode.

Figure 10:
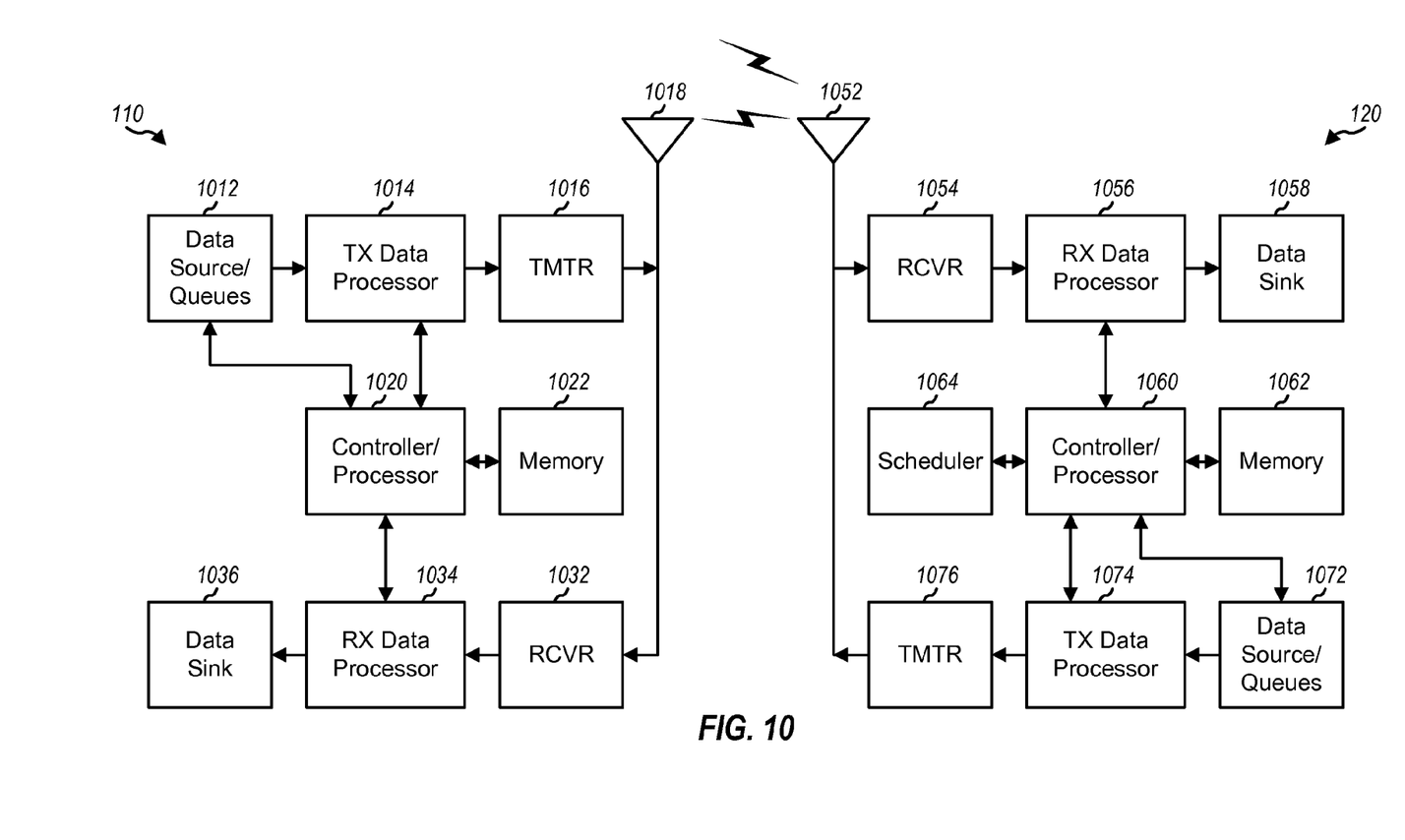
FIG. 10 shows a block diagram of a UE and a Node B.

FIG. 10 shows a block diagram of a design of UE 110 and Node B 120. For simplicity, FIG. 10 shows UE 110 and Node B 120 each having one antenna. In general, UE 110 and Node B 120 may each include any number of antennas. UE 110 and Node B 120 may support multiple-input multiple-output (MIMO) transmission from multiple antennas at one entity to multiple antennas at the other entity.

At UE 110, a transmit (TX) data processor 1014 receives data from data source/queues 1012 and signaling from a controller/processor 1020. TX data processor 1014 processes (e.g., encodes and symbol maps) the data and signaling, performs modulation (e.g., for CDMA), and provides output chips. A transmitter (TMTR) 1016 conditions (e.g., converts to analog, filters, amplifies, and upconverts) the output chips and generates an uplink signal, which is transmitted via an antenna 1018.

At Node B 120, an antenna 1052 receives uplink signals from UE 110 and other UEs and provides a received signal to a receiver (RCVR) 1054. Receiver 1054 conditions and digitizes the received signal and provides samples. A receive (RX) data processor 1056 performs demodulation on the samples (e.g., for CDMA) and processes (e.g., symbol demaps and decodes) the resultant symbols to obtain decoded data and signaling. Processor 1056 provides the decoded data to a data sink 1058 and provides the decoded signaling to a controller/processor 1060.

On the downlink, a TX data processor 1074 at Node B 120 receives data from data source/queues 1072 and control information from controller/processor 1060. The data and control information are processed (e.g., encoded, symbol mapped, and modulated) by TX data processor 1074 and further conditioned by a transmitter 1076 to generate a downlink signal, which is transmitted via antenna 1052. At UE 110, the downlink signal from Node B 120 is received by antenna 1018, conditioned by a receiver 1032, and demodulated and decoded by an RX data processor 1034. Processor 1034 provides decoded data to a data sink 1036 and provides decoded control information to controller/processor 1020.

Controllers/processors 1020 and 1060 direct the operation at UE 110 and Node B 120, respectively. Controller/processor 1020 may perform or direct process 600 in FIG. 6 for uplink data transmission, process 800 in FIG. 8, and/or other processes for the techniques described herein. Controller/processor 1020 may also implement available transmit power determination unit 400 in FIG. 4 and packet size selection unit 500 in FIG. 5. Controller/processor 1060 may perform or direct process 600 in FIG. 6 for downlink data transmission and/or other processes for the techniques described herein. Memories 1022 and 1062 store program code and data for UE 110 and Node B 120, respectively. A scheduler 1064 may schedule UEs for data transmission on the downlink and/or uplink and may assign resources to the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of transmitting data in a wireless communication system, comprising:
   determining a power headroom, wherein the power headroom is comprised of a ratio of a maximum transmit power to a pilot transmit power;
   filtering the power headroom;
   determining available transmit power based on filtered power headroom and transmit power for other transmissions;
   determining a first packet size based on a first function of the available transmit power, wherein the first function comprises a first mapping function based on a target number of transmissions after which the first packet size is decoded correctly with a target probability;
   sending a packet of the first packet size if the first packet size is equal to or larger than a minimum packet size; and
   sending a packet of a second packet size larger than the first packet size if the first packet size is smaller than the minimum packet size and if at least one condition is met, wherein the at least one condition is associated with one of the available transmit power, a third packet size, a delay of the packet, a priority of a flow, and a queue size, and wherein the second packet size is based on a second function of the available transmit power offset by a factor of lower probability of correct decoding than the target probability, wherein the second function comprises a second mapping function based on the target number of transmissions after which the second packet size is decoded correctly with a lower probability than the target probability.

2. The method of claim 1, further comprising:
determining a third packet size based on the available transmit power and a power offset, and wherein the at least one condition comprises the third packet size being equal to or larger than the minimum packet size.

3. The method of claim 2, wherein the power offset is determined based on a decoding probability lower than a target decoding probability.

4. The method of claim 2, further comprising:
using the third packet size as the second packet size.

5. The method of claim 1, further comprising:
using the minimum packet size as the second packet size.

6. The method of claim 1, further comprising:
determining whether the available transmit power is greater than a power threshold, and wherein the at least one condition comprises the available transmit power being greater than the power threshold.

7. The method of claim 1, further comprising:
determining whether a delay of a packet or a flow is larger than a delay threshold, and wherein the at least one condition comprises the delay being larger than the delay threshold.

8. The method of claim 1, wherein the at least one condition comprises a priority of a flow exceeding a priority threshold or a queue size for the flow exceeding a queue size threshold.

9. The method of claim 1, further comprising:
selecting a flow with highest priority among a plurality of flows; and
using a minimum packet size for the selected flow as the minimum packet size for comparison against the first packet size.

10. The method of claim 9, wherein each of the plurality of flows is associated with a respective minimum packet size determined based on data requirements of the flow.

11. An apparatus for wireless communication, comprising:
at least one processor configured to:
determine a power headroom, wherein the power headroom is comprised of a ratio of a maximum transmit power to a pilot transmit power;
filter the power headroom;
determine available transmit power based on filtered power headroom and transmit power for other transmissions; and
determine a first packet size, based on a first function of the available transmit power, wherein the first function comprises a first mapping function based on a target number of transmissions after which the first packet size is decoded correctly with a target probability;
send a packet of the first packet size if the first packet size is equal to or larger than a minimum packet size; and
send a packet of a second packet size larger than the first packet size if the first packet size is smaller than the minimum packet size and if at least one condition is met, wherein the at least one condition is associated with one of the available transmit power, a third packet size, a delay of the packet, a priority of a flow, and a queue size, and wherein the second packet size is based on a second function of the available transmit power offset by a factor of lower probability of correct decoding than the target probability, wherein the second function comprises a second mapping function based on the target number of transmissions after which the second packet size is decoded correctly with a lower probability than the target probability.

12. The apparatus of claim 11, wherein the at least one processor is configured to determine a third packet size based on the available transmit power and a power offset, and wherein the at least one condition comprises the third packet size being equal to or larger than the minimum packet size.

13. The apparatus of claim 11, wherein the at least one processor is configured to determine whether the available transmit power is greater than a power threshold, and wherein the at least one condition comprises the available transmit power being greater than the power threshold.

14. The apparatus of claim 11, wherein the at least one processor is configured to determine whether a delay of a packet or a flow is larger than a delay threshold, and wherein the at least one condition comprises the delay being larger than the delay threshold.

15. An integrated circuit comprising:
at least one processor configured to:
determine a power headroom, wherein the power headroom is comprised of a ratio of a maximum transmit power to a pilot transmit power;
filter the power headroom;
determine available transmit power based on filtered power headroom and transmit power for other transmissions; and
determine a first packet size, based on a first function of the available transmit power, wherein the first function comprises a first mapping function based on a target number of transmissions after which the first packet size is decoded correctly with a target probability;
send a packet of the first packet size if the first packet size is equal to or larger than a minimum packet size; and
send a packet of a second packet size larger than the first packet size if the first packet size is smaller than the minimum packet size and if at least one condition is met, wherein the at least one condition is associated with one of the available transmit power, a third packet size, a delay of the packet, a priority of a flow, and a queue size, and wherein the second packet size is based on a second function of the available transmit power offset by a factor of lower probability of correct decoding than the target probability, wherein the second function comprises a second mapping function based on the target number of transmissions after which the second packet size is decoded correctly with a lower probability than the target probability.

16. An apparatus for wireless communication, comprising:
means for determining a power headroom, wherein the power headroom is comprised of a ratio of a maximum transmit power to a pilot transmit power;
means for filtering the power headroom;
means for determining available transmit power based on filtered power headroom and transmit power for other transmissions;
means for determining a first packet size, based on a first function of the available transmit power, wherein the first function comprises a first mapping function based on a target number of transmissions after which the first packet size is decoded correctly with a target probability;
means for sending a packet of the first packet size if the first packet size is equal to or larger than a minimum packet size; and
means for sending a packet of a second packet size larger than the first packet size if the first packet size is smaller than the minimum packet size and if at least one condition is met, wherein the at least one condition is associated with one of the available transmit power, a third packet size, a delay of the packet, a priority of a flow, and a queue size, and wherein the second packet size is based on a second function of the available transmit power offset by a factor of lower probability of correct decoding than the target probability, wherein the second function comprises a second mapping function based on the target number of transmissions after which the second packet size is decoded correctly with a lower probability than the target probability.

17. The apparatus of claim 16, further comprising:
means for determining a third packet size based on the available transmit power and a power offset, and wherein the at least one condition comprises the third packet size being equal to or larger than the minimum packet size.

18. The apparatus of claim 16, further comprising:
means for determining whether the available transmit power is greater than a power threshold, and wherein the at least one condition comprises the available transmit power being greater than the power threshold.

19. The apparatus of claim 16, further comprising:
means for determining whether a delay of a packet or a flow is larger than a delay threshold, and wherein the at least one condition comprises the delay being larger than the delay threshold.

20. A non-transitory computer-readable medium including program code stored thereon, comprising:
program code to determine a power headroom, wherein the power headroom is comprised of a ratio of a maximum transmit power to a pilot transmit power;
program code to filter the power headroom;
program code to determine available transmit power based on filtered power headroom and transmit power for other transmissions;
program code to cause at least one computer to determine a first packet size, based on a first function of the available transmit power, wherein the first function comprises a first mapping function based on a target number of transmissions after which the first packet size is decoded correctly with a target probability;
program code to cause at least one computer to determine send a packet of the first packet size if the first packet size is equal to or larger than a minimum packet size; and
program code to cause at least one computer to determine send a packet of a second packet size larger than the first packet size if the first packet size is smaller than the minimum packet size and if at least one condition is met, wherein the at least one condition is associated with one of the available transmit power, a third packet size, a delay of the packet, a priority of a flow, and a queue size, and wherein the second packet size is based on a second function of the available transmit power offset by a factor of lower probability of correct decoding than the target probability, wherein the second function comprises a second mapping function based on the target number of transmissions after which the second packet size is decoded correctly with a lower probability than the target probability.

21. The non-transitory computer-readable medium of claim 20, further comprising:
program code to cause the at least one computer to determine a third packet size based on the available transmit power and a power offset, and wherein the at least one condition comprises the third packet size being equal to or larger than the minimum packet size.

22. The non-transitory computer-readable medium of claim 20, further comprising:
program code to cause the at least one computer to determine whether the available transmit power is greater than a power threshold, and wherein the at least one condition comprises the available transmit power being greater than the power threshold.

23. The non-transitory computer-readable medium of claim 20, further comprising:
program code to cause the at least one computer to determine whether a delay of a packet or a flow is larger than a delay threshold, and wherein the at least one condition comprises the delay being larger than the delay threshold.

* * * * *